US011898370B2

(12) United States Patent
Hiraoka et al.

(10) Patent No.: US 11,898,370 B2
(45) Date of Patent: Feb. 13, 2024

(54) HOUSE

(71) Applicant: SEKISUI HOUSE, LTD., Osaka (JP)

(72) Inventors: Chiho Hiraoka, Osaka (JP); Shouto Iwata, Osaka (JP); Tetsuya Yamato, Osaka (JP); Masayuki Ogawa, Osaka (JP); Yuusuke Minami, Osaka (JP); Takeshi Miki, Osaka (JP); Yuuta Kawazoe, Osaka (JP); Takahiro Suezawa, Osaka (JP); Shintarou Kawakami, Osaka (JP)

(73) Assignee: SEKISUI HOUSE, LTD., Osaka (JP)

( * ) Notice: Subject to any disclaimer, the term of this patent is extended or adjusted under 35 U.S.C. 154(b) by 803 days.

(21) Appl. No.: 17/041,606

(22) PCT Filed: Sep. 17, 2019

(86) PCT No.: PCT/JP2019/036271
§ 371 (c)(1),
(2) Date: Sep. 25, 2020

(87) PCT Pub. No.: WO2020/095542
PCT Pub. Date: May 14, 2020

(65) Prior Publication Data

US 2021/0010292 A1 Jan. 14, 2021

(30) Foreign Application Priority Data

Nov. 8, 2018 (JP) ................................ 2018-210322

(51) Int. Cl.
*E05B 43/00* (2006.01)
*E04H 1/02* (2006.01)
*E04H 6/02* (2006.01)

(52) U.S. Cl.
CPC ............ *E05B 43/005* (2013.01); *E04H 1/02* (2013.01); *E04H 6/02* (2013.01)

(58) Field of Classification Search
CPC . E04H 1/02; E04H 6/02; E05B 43/005; E05B 65/0888; E05B 19/003; E04B 1/348
See application file for complete search history.

(56) References Cited

U.S. PATENT DOCUMENTS 5,860,714 A * 1/1999 Skord, Jr. ................ G07F 9/10 312/249.8
10,575,500 B2 * 3/2020 Greer .................. A01K 29/005
2021/0010292 A1 * 1/2021 Hiraoka .................... E04H 6/02

FOREIGN PATENT DOCUMENTS

JP 61-179977 A 8/1986
JP 5-156875 A 6/1993

(Continued)

OTHER PUBLICATIONS

International Search Report issued in application No. PCT/JP2019/036271.

(Continued)

*Primary Examiner* — Andrew J Triggs
(74) *Attorney, Agent, or Firm* — McClure, Qualey & Rodack, LLP

(57) ABSTRACT

[PROBLEMS] Providing a house by which exhaust heat from equipment provided in a wall of the house does not adversely affect the environment in a living space, the maintenance, management, and update of the equipment can be easily performed, and crime prevention performance of an accommodating place of the equipment can be improved. [SOLUTIONS] The exhaust heat from the equipment 48 accommodated in the hollow portion 37 can be released to the second space 6 of the garage. Further, the electronic lock 45 of the door 43 for opening and closing the outdoor side opening portion 35 of the hollow portion 37 can be unlocked only for a preset time. Therefore, since unlocking is disabled except for the preset time, the maintenance, management, (Continued)

and update of the equipment 48 can be easily performed, and the crime prevention performance can be further improved.

4 Claims, 5 Drawing Sheets

(56) References Cited

FOREIGN PATENT DOCUMENTS

| | | | | |
|---|---|---|---|---|
| JP | H08193424 | A | * | 1/1995 |
| JP | 7-10214 | U | | 2/1995 |
| JP | H0716839 | Y2 | * | 4/1995 |
| JP | 2001040889 | A | * | 2/2001 |
| JP | 2001-81983 | A | | 3/2001 |
| JP | 2014-181553 | A | | 9/2014 |
| JP | 2018123489 | A | * | 8/2018 |

OTHER PUBLICATIONS

Japanese language article; "Relocating gas meter and such reform is also possible;" Internet <URL:https://www.acehome-joho.co.jp/blog/?p=3745; Oct. 2018; pp. 1-8.

Japanese language article; "Home delivery post COMBO-int for detached houses;" Internet: <URL:https://web.archive.org/web/20171201213848/https://sumai.panasonic.jp/exterior/tauhai/combo/combo_int.html>; Dec. 2017; pp. 1-4.

* cited by examiner

[FIG.1]
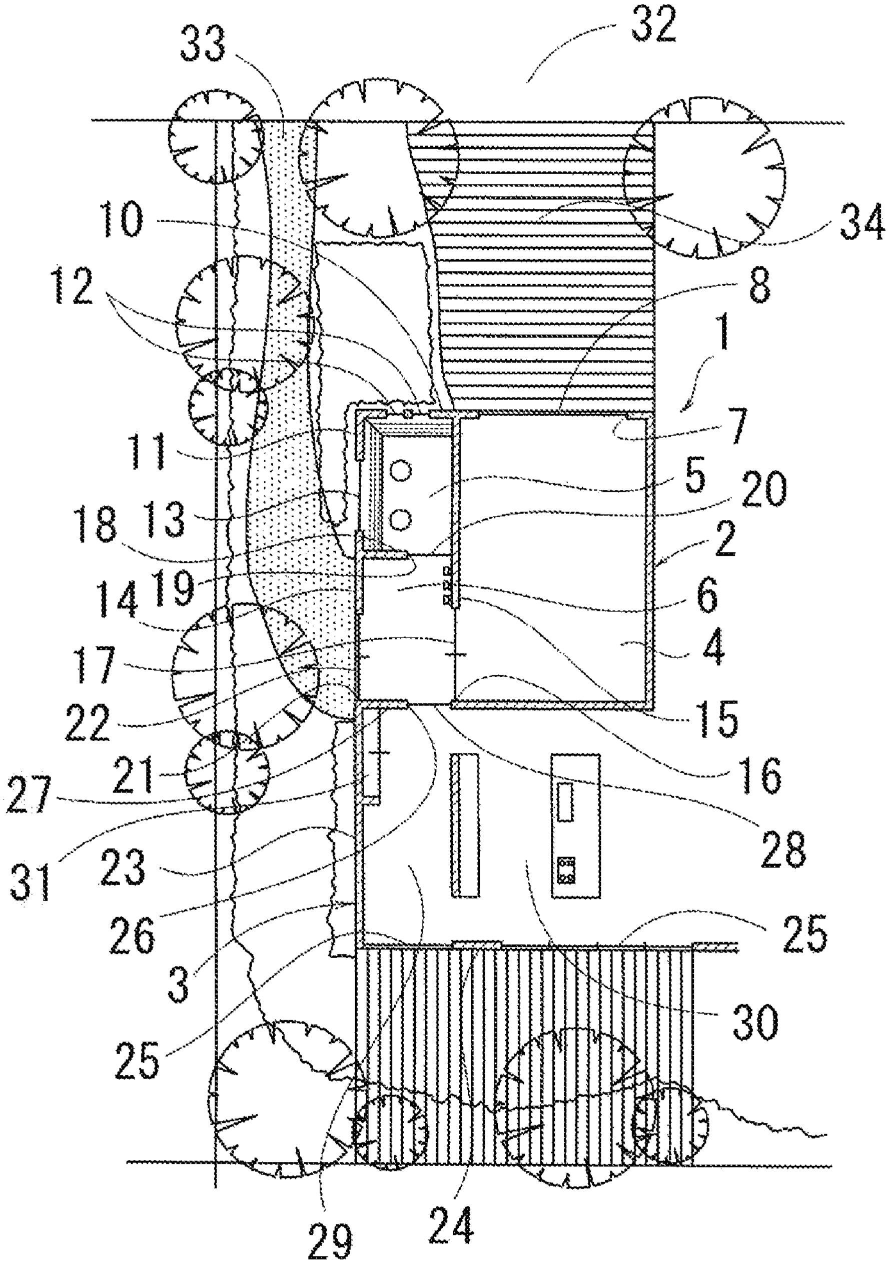

[FIG.2]
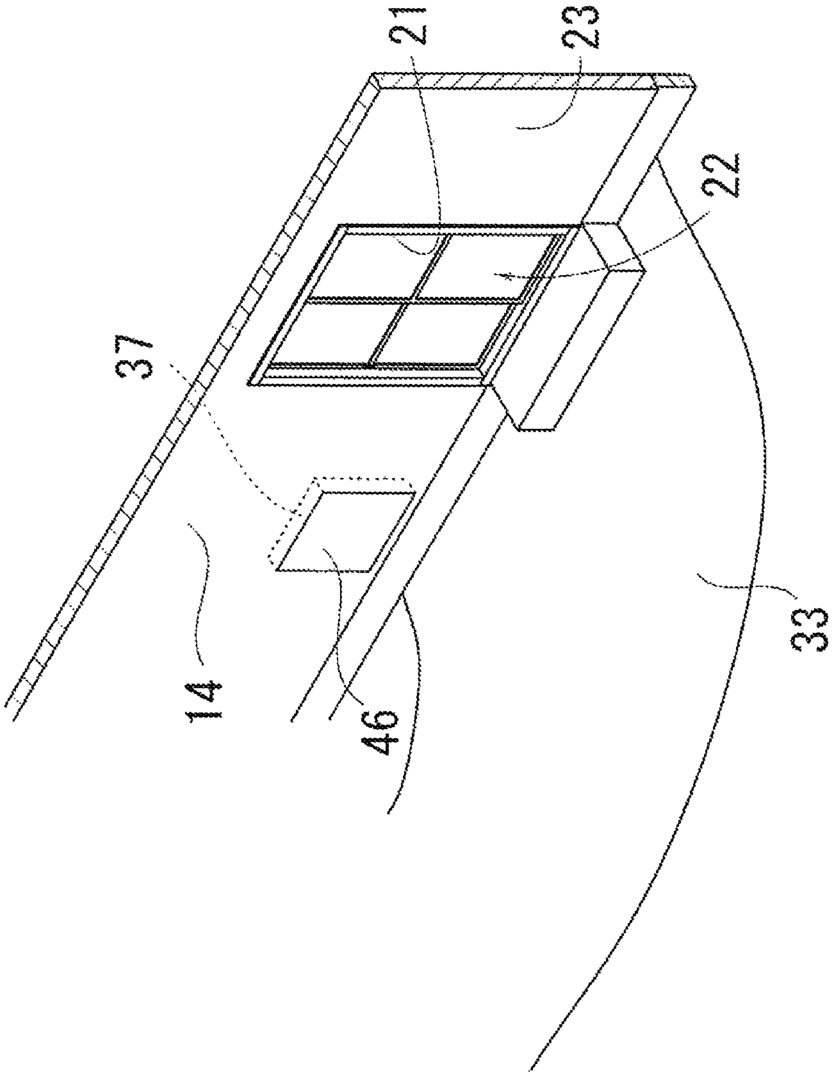

[FIG.3]
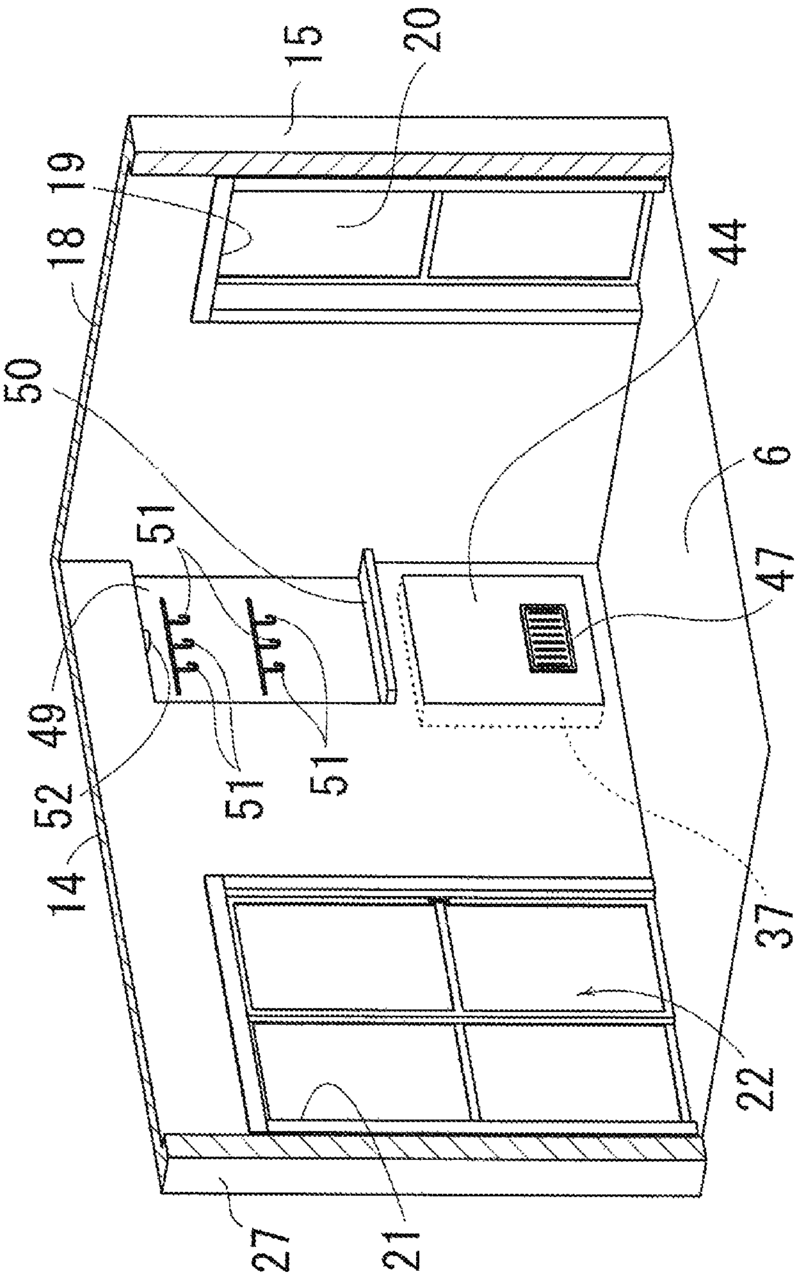

[FIG.4]
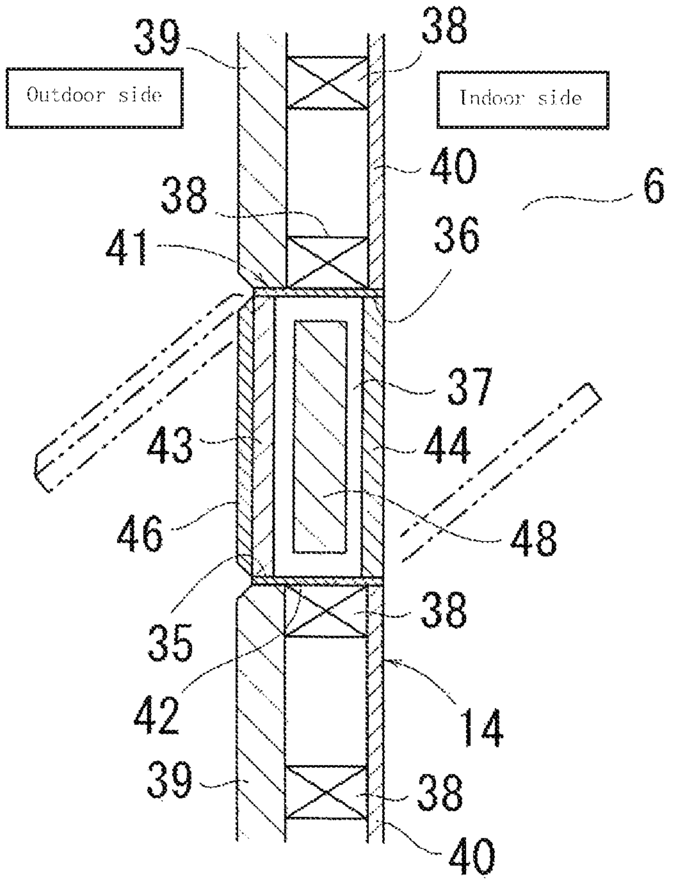

[FIG.5]
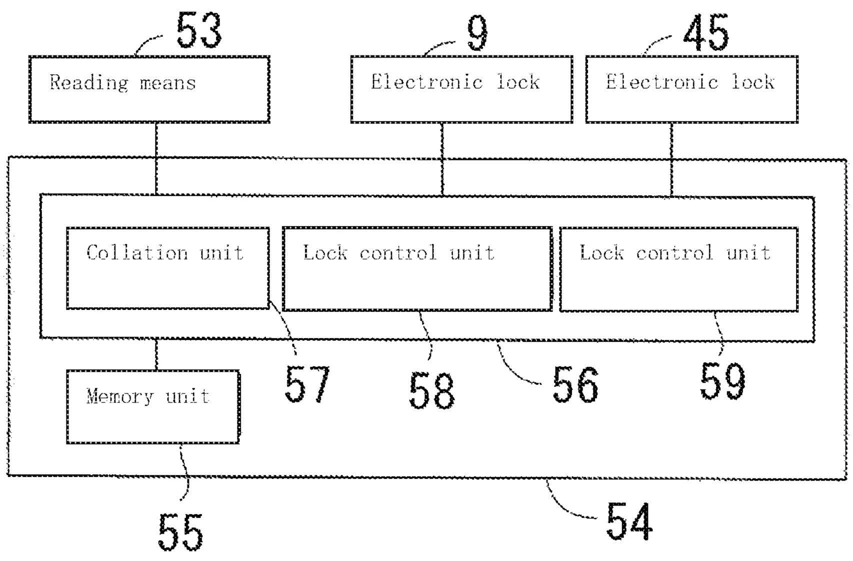

HOUSE

TECHNICAL FIELD

The present invention relates to a house including a garage in the inside, and more particularly, to a house including an accommodating part for equipment that needs inspection, in a wall section of the garage facing the outside.

BACKGROUND ART

Patent Literature 1 listed below discloses a wall surface structure by which aesthetics of a house can be improved by devising an arrangement of an electricity meter, a water heater, and a gas meter. In such a wall surface structure, a storage box provided with an openable and closable door is embedded at an appropriate position on the wall surface, and the electricity meter, the water heater, and the gas meter are collectively stored in the storage box.

CITATION LIST

Patent Literature

Patent Literature 1: JP H07-10214 U

SUMMARY OF THE INVENTION

Technical Problems

In the conventional case, however, no consideration is given to which wall surface of the house the storage box is attached to. Hence, in a case where the storage box is embedded on the wall surface of a living space such as a kitchen, the environment in the living space may be worsened by exhaust heat from the water heater. Therefore, in order to prevent this, it is conceivable to provide, in the storage box, a heat shield member of a material that does not transmit the exhaust heat from the water heater. However, in such a case, the heat shield member is costly. It is also conceivable that the storage box is formed of the heat shield member. However, in such a case, the cost for manufacturing the storage box increases.

The electricity meter, the water heater, and the gas meter stored in the storage box need maintenance such as preservation and inspection. In the conventional case, since the equipment such as the electricity meter is stored in the storage box, the equipment can be maintained and managed by performing the maintenance of the equipment even if no resident is at home. In addition, the maintenance of the equipment can be performed from the outside and the equipment can be updated. In the conventional case, however, since the storage box is only provided with a door, not only maintenance operators but also anyone is able to open the door at any time, which is not desirable for crime prevention.

The present invention has been made in view of such a problem, and has a main object to provide a house by which exhaust heat from equipment provided in a wall of the house does not adversely affect the environment in a living space, the maintenance, management, and update of the equipment can be easily performed, and crime prevention performance of an accommodating place of the equipment can be improved.

Solutions to the Problems

To achieve the above object a house according to the present invention is a house comprising a garage in an inside, wherein a hollow portion, in which an outdoor side opening portion is opened in an outdoor direction, is formed in a wall section of the garage facing an outside, a door is provided to be openable and closable in the outdoor side opening portion, and a control means controls an electronic lock that locks or unlocks the door to be unlockable only for a preset time.

Further, the house according to the present invention, wherein an entrance different from a car entrance of the garage is provided to be adjacent to the hollow portion in a wall section facing the outside, and an entrance that enables going back and forth between the garage and a living space is provided in a wall section between the garage and the living space.

Further, the house according to the present invention, wherein a passage that enables going back and forth between the garage and a road facing a site of the house through the different entrance is provided in the site of the house.

Further, the house according to the present invention, wherein an indoor side opening portion is opened in an indoor direction in the hollow portion, and a door is provided to be openable and closable in the indoor side opening portion.

Furthermore, the house according to the present invention, wherein when the control means unlocks one of the electronic lock that locks or unlocks the door for opening and closing the outdoor side opening portion and an electronic lock that locks or unlocks a door for opening and closing a car entrance of the garage, the control means controls the other to be unlocked in conjunction.

Advantageous Effects of Invention

According to a house of the present invention, a hollow portion, in which an outdoor side opening portion is opened in an outdoor direction, is formed in a wall section of the garage facing an outside, the garage being provided in an inside, and an openable and closable door is provided in the outdoor side opening portion. Therefore, when equipment is accommodated in the hollow portion, exhaust heat from the equipment is released to the garage. That is, since the heat can be exhausted to a space in the environment near the outside, the living space of the house is not adversely affected. Further, the electronic lock that locks or unlocks the door of the hollow portion is controlled to be unlockable only for a preset time. Hence, maintenance, management, and update of the equipment can be easily performed and the crime prevention performance is superior.

Further, according to the house of the present invention, an entrance different from a car entrance of the garage is provided to be adjacent to the hollow portion, in which equipment is accommodated, in a wall section of the garage facing the outside, the garage being provided in the inside, and an entrance is also provided in a wall section between the garage and the living space. Therefore, since it is easy to go out of the house to the outdoor side of the hollow portion, in which the equipment is accommodated, through the entrance between the garage and the living space and the different entrance, a resident is able to move easily at the time of the maintenance of the equipment.

Further, according to the house of the present invention, there is provided a passage that enables going back and forth between the garage and a road facing a site through the different entrance. Therefore, the passage used by a resident to go back and forth between the inside of the house and the road and the passage used by an operator to go back and forth between the road and the outdoor side of the hollow portion in which the equipment is accommodated can be commonly used.

Further, according to house of the present invention, an openable and closable door is provided in the indoor side opening portion of the hollow portion that is formed in the wall section of the garage facing the outside. Therefore, the maintenance of the equipment in the hollow portion can be performed from the garage side.

Furthermore, according to the house of the present invention, an electronic lock of the door of the outdoor side opening portion of the hollow portion in which the equipment is accommodated and an electronic lock of the door for opening and closing the car entrance of the garage can be released in conjunction with each other. Hence, the operator's car can be parked in the garage.

BRIEF DESCRIPTION OF THE DRAWINGS

FIG. 1 is a floor plan showing a configuration of a first floor of a house according to an embodiment of the present invention, and the first floor is partially omitted.

FIG. 2 is a schematic perspective view of a substantial part of the house of FIG. 1, showing a state when viewed from the outdoor side.

FIG. 3 is a schematic perspective view of the substantial part of the house of FIG. 1, showing a state when viewed from the indoor side.

FIG. 4 is a schematic enlarged cross-sectional view of the substantial part of the house of FIG. 1.

FIG. 5 is a block diagram showing a configuration of an electronic lock system used in the house of FIG. 1.

DESCRIPTION OF EMBODIMENTS

Hereinafter, specific embodiments of a house according to the present invention will be described in detail with reference to the drawings.

FIGS. 1 to 4 are schematic views showing a house according to an embodiment of the present invention. FIG. 1 is a floor plan of a first floor in which a configuration of the first floor is partially omitted. FIG. 2 is a schematic perspective view showing a state in which a substantial part is viewed from an outdoor side. FIG. 3 is a schematic perspective view showing a state in which the substantial part is viewed from an indoor side. FIG. 4 is a schematic enlarged cross-sectional view of the substantial part of FIG. 1. A house 1 according to the present embodiment is a house in which a garage 2 is provided in the inside and includes what is called a built-in garage. Here, the house 1 has a two-story structure, but the structure is not limited to this, and may be a one-story structure or a three-story structure or more. The first floor of the house 1 includes the garage 2 arranged on the front side in a depth direction and a living space 3 arranged on the back side in the depth direction.

The garage 2 is formed in a substantially quadrangular shape in a top view, and includes a parking space 4, which is a space where a car is parked, and two spaces including a first space 5 and a second space 6, which are arranged independently of the parking space 4. The parking space 4 is formed in a substantially rectangular shape in a top view with the depth direction as a longitudinal direction, and a car entrance 7 is opened on the front side. An openable and closable door 8 is provided at the car entrance 7, and the door 8 can be locked or unlocked by an electronic lock 9 (FIG. 5). The first space 5 is formed in a substantially quadrangular shape in a top view, and is arranged to be adjacent to one side of the parking space 4 in a frontage direction, on the front side of the parking space 4 in the depth direction. The second space 6 is formed in a substantially quadrangular shape in a top view, and is arranged to be adjacent to one side of the parking space 4 in the frontage direction, on the back side of the parking space 4 in the depth direction.

Here, the first space 5 and the second space 6 are arranged to be adjacent to each other in the depth direction. In this case, regarding the first space 5, a wall section 10 on the front side of the house 1 in the depth direction and a wall section 11 on one side of the house 1 in the frontage direction face the outside. Windows 12 and 13 are provided on the wall sections 10 and 11, respectively. Regarding the second space 6, a wall section 14 on one side of the house 1 in the frontage direction faces the outside.

A wall section 15 between the parking space 4 and the second space 6 is provided with an entrance 16, which enables going back and forth between the parking space 4 and the second space 6, and the entrance 16 is provided with an openable and closable door 17. A wall section 18 between the first space 5 and the second space 6 is provided with an entrance 19, which enables going back and forth between the first space 5 and the second space 6, and the entrance 19 is provided with an openable and closable door 20. Further, the wall section 14 of the second space 6 is provided with an entrance 21, which communicates the inside and the outside of the second space 6, and the entrance 21 is provided with an openable and closable door 22. In the shown example, the door 22 of the second space 6 is a sliding door.

The living space 3 is formed in a substantially rectangular shape in a top view, and is arranged to be adjacent to the back side of the garage 2. In this case, regarding the living space 3, a wall section 23 on one side of the house 1 in the frontage direction faces the outside. As shown in FIG. 1, the wall section 23 of the living space 3, the wall section 14 of the second space 6, and the wall section 11 of the first space 5 are continuously formed. Further, regarding the living space 3, a wall section 24 on the back side of the house 1 in the depth direction faces the outside, and a window 25 is provided in the wall section 24. A wall section between the living space 3 and the garage 2 is provided with an entrance 26, which enables going back and forth between the living space 3 and the garage 2. In the present embodiment, a wall section 27 between the living space 3 and the second space 6 is provided with the entrance 26, which enables going back and forth between the living space 3 and the second space 6, and the entrance 26 is provided with an openable and closable door 28. It should be noted that each of the doors 17, 20, 22, and 28 is a door with a key.

In the present embodiment, the first space 5 is not limited in particular, but is a space for hobbies, for example. Typically, the first space 5 is a workspace for making something. The second space 6 is a passage for passing through when going out to the outside from the parking space 4, the first space 5 or the living space 3, passing through when entering the parking space 4, the first space 5, or the living space 3 from the outside, or passing through when going back and forth among the respective spaces 3, 4, and 5. The living space 3 includes a housework room 29 arranged on one side of the house 1 in the frontage direction, and a kitchen 30 arranged on the other side of the house 1 in the frontage direction. The housework room 29 and the kitchen 30 are arranged to be adjacent to each other to enable going back and forth between the housework room 29 and the kitchen 30. Here, the housework room 29 is a space for doing housework, and includes a storage part 31, in which tools used for doing housework can be stored.

Although not shown in the figure, a house entrance, another living space, and the like are arranged to be adjacent to the garage 2 and the living space 3 described above, on the other side in the frontage direction. On the upper part of the first floor of the house 1 having such a configuration, a second floor of the house 1 is arranged in an overlapping manner. Thus, the upper part of the garage 2 is covered with the second floor of the house 1. That is, the garage 2 is provided in the inside on the first floor of the house 1.

As shown in FIG. 1, in the site of the house 1, a passage 33 is provided to enable going back and forth between the garage 2 and a road 32 facing the site of the house 1 through the entrance 21, which is different from the car entrance 7 of the garage 2. In the present embodiment, the passage 33 is provided to enable going back and forth between the second space 6 of the garage 2 and the road 32 through the entrance 21 formed in the wall section 14 of the second space 6. The passage 33 is a passage for a person to pass through, and is provided between the road 32 and the entrance 21, which is a kitchen entrance. Further, in the site of the house 1, between the parking space 4 of the garage 2 and the road 32, a passage 34 is provided to enable going back and forth between the parking space 4 of the garage 2 and the road 32 through the car entrance 7. The passage 34 has a depth length substantially the same as the depth length of the parking space 4, and a car can be parked along the depth direction.

In the house 1 according to the present embodiment, a hollow portion 37 is formed in the wall section of the garage 2 facing the outside such that an outdoor side opening portion 35 is opened in an outdoor direction and an indoor side opening portion 36 is opened in an indoor direction. In the shown example, the hollow portion 37 having a substantially quadrangular shape when viewed from the outdoor side or the indoor side is formed at a lower end portion of the wall section 14 of the second space 6 of the garage 2 facing the outside. That is, a through hole that communicates the inside and the outside is formed in the wall section 14 of the second space 6 facing the outdoor side. It should be noted that in the present embodiment, the hollow portion 37 has a vertical length of approximately 1 m and a horizontal length of approximately 1 m.

As described above, the hollow portion 37 and the entrance 21, which is the kitchen entrance, are provided in the wall section 14 of the second space 6 facing the outside. In this case, the wall section 14 of the second space 6 facing the outside is provided with the entrance 21, which is adjacent to the hollow portion 37. Therefore, a person is able to go to the outdoor side of the hollow portion 37 through the passage 33.

As shown in FIG. 4, the hollow portion 37 in the wall section 14 of the second space 6 facing the outside is formed within a frame that is defined by adjacent column members 38 of the wall section 14 and horizontal members respectively bridged between the column members 38, 38. In this case, the hollow portion 37 is formed in the wall section 14 such that the outdoor side opening portion 35 is formed to be opened in an outer wall material 39 arranged on the outdoor side of the column members 38, whereas the indoor side opening portion 36 is formed to be opened in an inner wall material 40 arranged on the indoor side of the column members 38, and internal constitution components such as a heat insulation material inside the wall are removed.

In the hollow portion 37 formed in the wall section 14, a box body 41 having a substantially rectangular box shape is provided. The box body 41 includes a cylindrical box main body 42 having both axial ends that are opened, a first lid body 43 for opening and closing an opening on one axial end side of the box main body 42, and a second lid body 44 for opening and closing an opening on the other axial end of the box main body 42. The box main body 42 is formed in a substantially rectangular cylindrical shape, and is secured to the column members 38 and the horizontal members with nails or the like in a state of being arranged in the hollow portion 37. In this case, the box main body 42 is arranged in the hollow portion 37 such that the axial direction is arranged along an indoor-outdoor direction of the wall section 14. The first lid body 43 is formed in a substantially quadrangular plate shape, and is provided at one axial end portion of the box main body 42 so as to be openable and closable by a hinge. The second lid body 44 is formed in a substantially quadrangular plate shape, and is provided at the other axial end portion of the box main body 42 so as to be openable and closable by a hinge.

Accordingly, the outdoor side opening portion 35 of the hollow portion 37 is made openable and closable by the first lid body 43, and the indoor side opening portion 36 of the hollow portion 37 is made openable and closable by the second lid body 44. That is, the first lid body 43 serves as a door for opening and closing the outdoor side opening portion 35 of the hollow portion 37, whereas the second lid body 44 serves as a door for opening and closing the indoor side opening portion 36 of the hollow portion 37. In this way, the doors 43 and 44 are respectively provided to be openable and closable in the outdoor side opening portion 35 and the indoor side opening portion 36 of the hollow portion 37. The door 43 provided in the outdoor side opening portion 35 can be locked and unlocked by an electronic lock 45 (FIG. 5).

On an outdoor side surface of the door 43 for opening and closing the outdoor side opening portion 35 of the hollow portion 37, the same pattern as that of the outer wall material 39 of the wall section 14 is provided. For example, a plate material 46 formed by imitating the outer wall material 39 is provided on the outdoor side surface of the door 43. Further, as shown in FIG. 3, a louver 47, which communicates the inside of the hollow portion 37 and the second space 6, is provided at a lower end portion of the door 44 for opening and closing the indoor side opening portion 36 of the hollow portion 37.

Equipment 48, which needs maintenance and inspection, is accommodated inside the box body 41 provided in the hollow portion 37. Examples of the equipment 48 include a water heater, a gas meter, a water meter, an electricity meter, or the like. Further, the equipment 48, which needs maintenance and inspection, may be any equipment usually installed inside the house, for example, a server. It should be noted that, in the hollow portion 37, it is preferable to accommodate the equipment that exhausts heat, out of these pieces of equipment 48.

By the way, as shown in FIG. 3, in the present embodiment, in the wall section 14 of the second space 6 that is a wall section of the garage 2 facing the outside, a recess part 49 is formed to be recessed in an outdoor direction on the surface of the indoor side above the hollow portion 37. The recess part 49 is formed in a substantially quadrangular shape when viewed from the indoor side, and is formed to let an upper end portion of the wall section 14 remain. A plate member 50, on which an object such as a charger for an information terminal can be placed, is provided at a lower end portion of the recess part 49 with plate surfaces respectively facing upward and downward. On the wall surface of the wall section 14 in which the recess part 49 is formed, a plurality of hooks 51, to which objects such as a car key can be hooked, are provided. An illumination 52 is provided on an upper end portion of the recess part 49. A duct pipe extending from the kitchen 30 is disposed in the wall section 14 above the recess part 49. Specifically, the duct pipe is arranged in the remaining wall section 14, as described above. One end of the duct pipe is connected to an exhaust hole formed on the outdoor side of the remaining wall section 14.

Next, a description will be given of an unlocking operation of the electronic lock 45, which locks or unlocks the door 43 for opening and closing the outdoor side opening portion 35 of the hollow portion 37, and the electronic lock 9, which locks or unlocks the door 8 for opening and closing the car entrance 7 of the garage 2. FIG. 5 is a block diagram showing a configuration of an electronic lock system used in the house according to the present embodiment. As shown in this figure, the system according to the present embodiment includes the two electronic locks 9 and 45 described above, a reading means 53 for reading authentication information for unlocking the two electronic locks 9 and 45, and a control means 54 for controlling the two electronic locks 9 and 45.

In the present embodiment, a QR code (registered trademark) is used as the authentication information. The QR code is registered beforehand as an image in a known method in an information terminal or the like of a person who performs the unlocking operation. It should be noted that the authentication information is not limited to the QR code, and may be, for example, information supplied from a contactless card with a built-in IC chip or a password number entered by operating ten keys.

The reading means 53 is provided on the outdoor side of the garage 2, and serves as a means capable of receiving an input of the authentication information from the outside. In the present embodiment, since the QR code is used as the authentication information, the reading means 53 is configured to photograph the QR code with a camera.

The control means 54 includes a memory unit 55 and a CPU 56. The memory unit 55 stores collation information used for collation with the authentication information. In the present embodiment, since the QR code is used as the authentication information, the memory unit 55 stores an identical QR code to the QR code of the authentication information. The CPU 56 is what is called a central processing unit, and includes a collation unit 57 and lock control units 58 and 59, in the present embodiment. The collation unit 57 collates the authentication information from the reading means 53 with collation information in the memory unit 55. The lock control unit 58 is capable of unlocking the electronic lock 9 of the door 8 of the car entrance 7, based on a collation result of the collation unit 57. On the other hand, the lock control unit 59 is capable of unlocking the electronic lock 45 of the door 43 of the outdoor side opening portion 35 of the hollow portion 37, based on the collation result of the collation unit 57.

In the present embodiment, the electronic lock 45 of the door 43 for opening and closing the outdoor side opening portion 35 of the hollow portion 37 is controlled by the control means 54 to be unlockable only for a preset time. In addition to this, when the control means 54 unlocks the electronic lock 9 of the door 8 for opening and closing the car entrance 7 of the garage 2, the control means 54 controls the electronic lock 45 of the door 43 for opening and closing the outdoor side opening portion 35 of the hollow portion 37 to be unlocked in conjunction. Therefore, the unlocking process is as follows.

In the present embodiment, first, a person who performs the unlocking operation displays the QR code stored in the information terminal on the screen of the information terminal, and exposes the screen displaying the QR code to the reading means 53. When the QR code is exposed to the reading means 53, the QR code is photographed by the camera of the reading means 53, and the image of the photographed QR code is transmitted to the collation unit 57. The collation unit 57 determines whether the photographed QR code image and the QR code image stored in the memory unit 55 match. Here, in the case of the present embodiment, since unlocking is enabled only for the preset time, the memory unit 55 stores the QR code in association with an unlockable time. On the other hand, the control means 54 is capable of grasping the current time by itself. Accordingly, whether the QR code images match each other is determined, and whether the current time matches the unlockable time is also determined.

When it is determined that the both match, a signal for unlocking the electronic lock 9 is transmitted to the lock control unit 58. This causes the lock control unit 58 to unlock the electronic lock 9 of the door 8 for opening and closing the car entrance 7 of the garage 2. When the electronic lock 9 is unlocked, a signal indicating that the electronic lock 9 is unlocked is transmitted from the electronic lock 9 to the lock control unit 58. Then, a signal for unlocking the electronic lock 45 is transmitted to the other lock control unit 59. This causes the lock control unit 59 to unlock the electronic lock 45 of the door 43 for opening and closing the outdoor side opening portion 35 of the hollow portion 37. On the other hand, when it is determined that the images and/or the times do not match, the electronic lock 9 is not unlocked and the electronic lock 45 is not unlocked accordingly. It should be noted that the electronic lock 45 on the hollow portion 37 side and the electronic lock 9 on the garage 2 side are locked independently of each other.

In the case of the house 1 according to the present embodiment, since the hollow portion 37 for accommodating the equipment 48 is formed in the wall section 14 of the second space 6 of the garage 2 facing the outside, the exhaust heat from the equipment 48 can be released to the second space 6. Since the second space 6 is a space mainly used as a passage, no problem occurs even if the exhaust heat from the equipment 48 is released. Further, in the case of the house 1 according to the present embodiment, the electronic lock 45 of the door 43 for opening and closing the outdoor side opening portion 35 of the hollow portion 37 can be unlocked only for a preset time. Therefore, since unlocking is disabled except for the preset time, the crime prevention performance can be further improved. In addition, the electronic lock 45 of the door 43 of the hollow portion 37 can be unlocked in conjunction with the electronic lock 9 of the door 8 of the car entrance 7 of the garage 2. Therefore, the car of an operator who inspects the equipment 48 can be parked in the garage 2, and in addition, the time and effort in inspecting the equipment 48 can be reduced.

Further, in the case of the house 1 according to the present embodiment, the entrance 21 is provided in the wall section 14 of the second space 6 facing the outside, and the entrance 26 is provided in the wall section 27 between the housework room 29 and the second space 6. Therefore, a resident is able to move from the housework room 29 through the second space 6 to the outside, and is thus able to easily go to the outside when performing the maintenance of the equipment 48 in the hollow portion 37. Further, in the case of the house 1 according to the present embodiment, since the door 44 for opening and closing the indoor side opening portion 36 of the hollow portion 37 is included, the maintenance of the equipment 48 can be easily performed from the indoor side.

Further, in the case of the house 1 according to the present embodiment, the passage 33 is provided in the site of the house 1 between the entrance 21 formed in the wall section 14 of the second space 6 facing the outside and the road 32 facing the site. Therefore, the passage through which an operator passes for the maintenance and the passage through which a resident passes to go to the road 32 after passing through the entrance 21 can be commonly used, and the site can be effectively utilized. In addition, in the case of the house 1 according to the present embodiment, the door 43 for opening and closing the outdoor side opening portion 35 of the hollow portion 37 is provided with the plate material 46 imitating an outer wall on the surface on the outdoor side. Therefore, the door 43 can be made inconspicuous and the appearance of the house 1 is not worsened.

In the case of the house 1 according to the present embodiment, the equipment 48 is accommodated in the hollow portion 37. By accommodating a plurality of pieces of equipment 48 in the hollow portion 37, the plurality of pieces of equipment 48 can be gathered together and the maintenance performance can be improved. Further, in the case of the house 1 according to the present embodiment, the equipment 48 such as a server installed inside the house can be accommodated in the hollow portion 37. Usually, at the time of maintenance of the equipment 48 installed inside the house, a resident has to attend on an operator and the resident's going out of the house is restricted. In addition, it is difficult to ensure the crime prevention performance because the operator is allowed to enter the house. However, in the present embodiment, since the maintenance for the equipment 48 installed inside the house can be performed from the outdoor side, such inconvenience does not occur. Furthermore, in the case of the house 1 according to the present embodiment, the equipment 48 installed inside the house can be stored in the hollow portion 37. Therefore, the exposure of the equipment 48 to the inside can be eliminated, the indoor space can be effectively utilized, and the interior design property of the indoor space can be improved.

The house according to the present invention is not limited to the configuration of the above-described embodiment, but can be modified as appropriate. For example, in the above-described embodiment, in conjunction with unlocking the electronic lock 5 of the door 8 for opening and closing the car entrance 7 of the garage 2, the electronic lock 45 of the door 43 for opening and closing the outdoor side opening portion 35 of the hollow portion 37 is unlocked. Conversely, in conjunction with unlocking the electronic lock 45 on the hollow portion 37 side, unlocking the electronic lock 9 on the garage 2 side may be controlled. In this case, the reading means 53 is installed on the outdoor side of the second space 6. That is, it is sufficient if the control means 54 controls unlocking one of the electronic lock 45 of the door 43 for opening and closing the outdoor side opening portion 35 of the hollow portion 37 and the electronic lock 9 of the door 8 for opening and closing the car entrance 7 of the garage 2, and at this timing, controls unlocking the other in conjunction. Further, in the above embodiment, the electronic lock 45 on the hollow portion 37 side and the electronic lock 9 on the garage 2 side are unlocked in conjunction with each other, but may be configured to be unlocked independently of each other. In this case, the reading means 53 is installed on the outdoor side of the second space 6.

Furthermore, in the above-described embodiment, the living space 3 is arranged on the back side of the garage 2. However, the present invention is not limited to this, and any house including the garage 2 in the inside is applicable. For example, the living space 3 may be arranged on the other side of the garage 2 in the frontage direction. In this case, the garage 2 includes the car parking space 4 and the second space 6 arranged on the back side of the parking space 4. Going back and forth between the garage 2 and the outside is enabled through the second space 6, and going back and forth between the living space 3 and the outside is enabled through the second space 6. Going back and forth between the garage 2 and the living space 3 is enabled through the second space 6.

INDUSTRIAL APPLICABILITY

A house according to the present invention is suitably applied in a case where equipment is accommodated in a wall section, facing the outside, of a garage provided in the inside.

DESCRIPTION OF REFERENCE SIGNS 1 house
2 garage
3 living space
7 entrance
8 door
9 electronic lock
14 wall section
21 entrance
26 entrance
27 wall section
32 road
33 passage
35 outdoor side opening portion
36 indoor side opening portion
37 hollow portion
43 first lid body
44 second lid body (door)
45 electronic lock (door)
54 control means

The invention claimed is:

1. A house comprising:
a garage in an inside of the house;
a wall section having an outer wall material facing an outside of the garage and an inner wall material facing the garage, the outer wall material and the inner wall material forming a hollow portion therebetween;
an outdoor side opening portion opened in the outer wall material of the wall section to provide access to the hollow portion from the outside of the house;
an outdoor side door openable and closable in the outdoor side opening portion;
an indoor side opening portion opened in the inner wall material of the hollow portion to provide access to the hollow portion from the inside of the house;
an indoor side door openable and closable in the indoor side opening portion, the indoor side door having a louver which communicates with the hollow portion;
equipment, which is operative to generate heat, accommodated in the hollow portion; and a control means having a first electronic lock that locks or unlocks the outdoor side door, the control means being configured to unlock the first electronic lock in response to an authentication input being received during a preset time period, wherein receipt of the authentication input outside of the preset time period results in the first electronic lock remaining locked.

2. The house according to claim 1, further comprising:

an outdoor entrance, different from a car entrance of the garage, adjacent to the hollow portion in a second wall section facing the outside; and an entrance that enables going back and forth between the garage and a living space is provided in a third wall section between the garage and the living space.

3. The house according to claim 2, further comprising a passage that enables going back and forth between the garage and a road facing a side of the house through the outdoor entrance.

4. The house according to claim 1, wherein:

the first electronic lock locks or unlocks a garage entrance door for opening and closing a car entrance of the garage;

the control means has a second electronic lock that locks or unlocks the outdoor side door for opening and closing the outdoor side opening portion; and the control means is operative to unlock both the first electronic lock and the second electronic lock in response to an authentication input, provided during the preset time period, for unlocking either the first electronic lock or the second electronic lock, so that both the first electronic lock and the second electronic lock unlocked in conjunction.

* * * * *